United States Patent
Silva et al.

(10) Patent No.: US 11,202,491 B2
(45) Date of Patent: Dec. 21, 2021

(54) COLOR CHANGING COSMETIC TOOL

(71) Applicant: Rea.deeming Beauty, Inc., Bethlehem, PA (US)

(72) Inventors: Rea Ann Silva, Bethlehem, PA (US); Brittany Blass, Venice, CA (US)

(73) Assignee: REA.DEEMING BEAUTY, INC., Bethlehem, PA (US)

( * ) Notice: Subject to any disclaimer, the term of this patent is extended or adjusted under 35 U.S.C. 154(b) by 0 days.

(21) Appl. No.: 16/917,724

(22) Filed: Jun. 30, 2020

(65) Prior Publication Data
US 2021/0000239 A1    Jan. 7, 2021

Related U.S. Application Data

(60) Provisional application No. 62/869,460, filed on Jul. 1, 2019.

(51) Int. Cl.
*A45D 34/04* (2006.01)
*C09D 5/26* (2006.01)

(52) U.S. Cl.
CPC ............ *A45D 34/041* (2013.01); *C09D 5/26* (2013.01); *A45D 2200/1018* (2013.01); *A45D 2200/1036* (2013.01)

(58) Field of Classification Search
CPC .......... A45D 34/041; A45D 2200/1018; A45D 2200/1036; A45D 2200/1009; A45D 2200/1063; A45D 34/00; A45D 40/24; A45D 40/262; A45D 34/042; C09D 5/26; C09D 5/00; C09D 5/035; C09D 5/29
See application file for complete search history.

(56) References Cited

U.S. PATENT DOCUMENTS

| | | | |
|---|---|---|---|
| 3,472,242 A | 10/1969 | Demner | |
| 6,585,555 B2* | 7/2003 | Wong | A63H 23/00 374/141 |
| 7,448,814 B2* | 11/2008 | Bouix | A45D 2/48 401/2 |
| 8,343,908 B2* | 1/2013 | Mundschau | B32B 5/245 510/438 |
| 2005/0138747 A1 | 6/2005 | Su et al. | |

(Continued)

FOREIGN PATENT DOCUMENTS

WO    2020010466 A1    1/2020

OTHER PUBLICATIONS

International Search Report and Written Opinion for PCT/US2020/40367, dated Sep. 21, 2020.

(Continued)

*Primary Examiner* — David J Walczak
(74) *Attorney, Agent, or Firm* — Concept IP LLP; Pejman Yedidsion

(57) ABSTRACT

Systems, devices, and methods for a cosmetic sponge having: a tip portion at one end of the cosmetic sponge; an angled portion, where the tip portion is surrounded by the angled portion; a bulbous portion, where the bulbous portion is disposed proximate a bottom of the cosmetic sponge; and a bottom portion, where the bottom portion is surrounded by the bulbous portion; and a thermochromic pigment in at least a portion of the cosmetic sponge, where the portion of the cosmetic sponge changes from a first color at a first temperature to a second color at a second temperature.

16 Claims, 8 Drawing Sheets

(56) References Cited

U.S. PATENT DOCUMENTS

| | | |
|---|---|---|
| 2006/0246118 A1 | 11/2006 | Gueret |
| 2006/0287215 A1* | 12/2006 | McDonald ............. C11D 9/444 |
| | | 510/441 |
| 2008/0232427 A1* | 9/2008 | Leute ..................... G01K 11/06 |
| | | 374/161 |
| 2016/0297061 A1* | 10/2016 | Konkey ................... A47K 7/02 |
| 2018/0317628 A1* | 11/2018 | Villarreal ............... A45D 34/04 |
| 2018/0338600 A1 | 11/2018 | Dizes |
| 2019/0069662 A1 | 3/2019 | Peters |

OTHER PUBLICATIONS

Peachy-Color Changing Blending Sponge (Primalux) Mar. 12, 2019 (Mar. 12, 2019) [online] (retrieved from internet on Aug. 31, 2020), entire document, especially p. 1; p. 4.

* cited by examiner

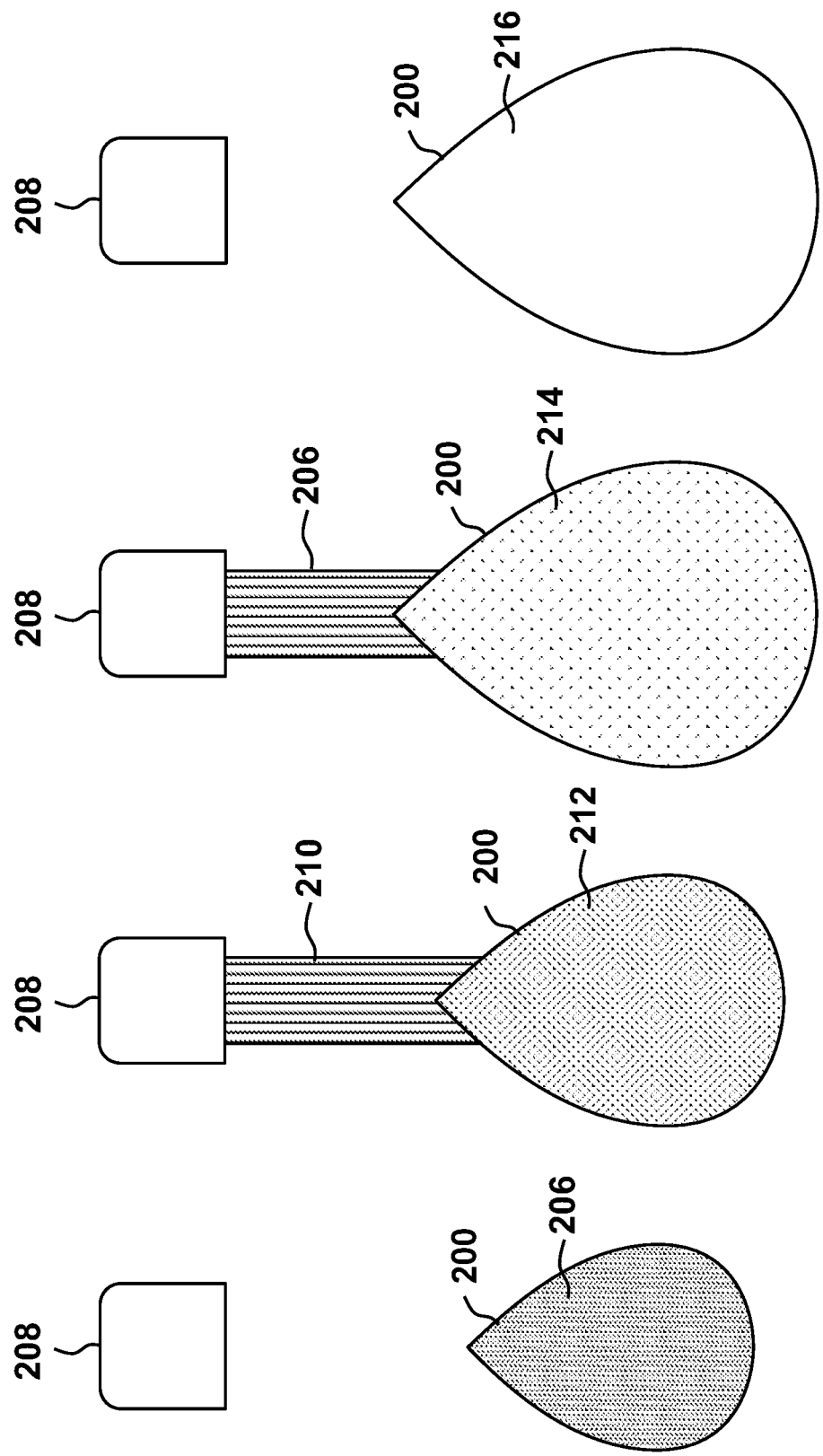

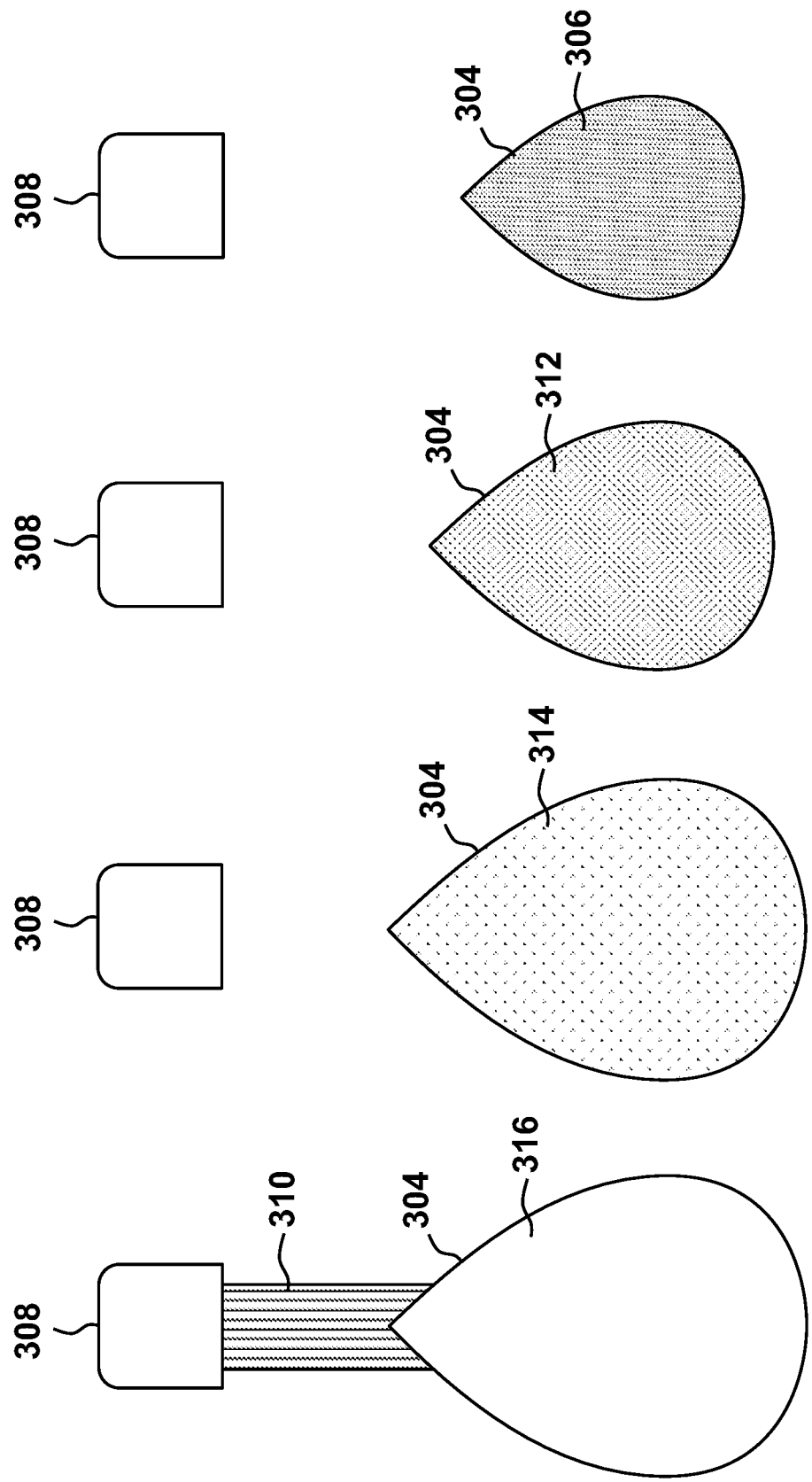

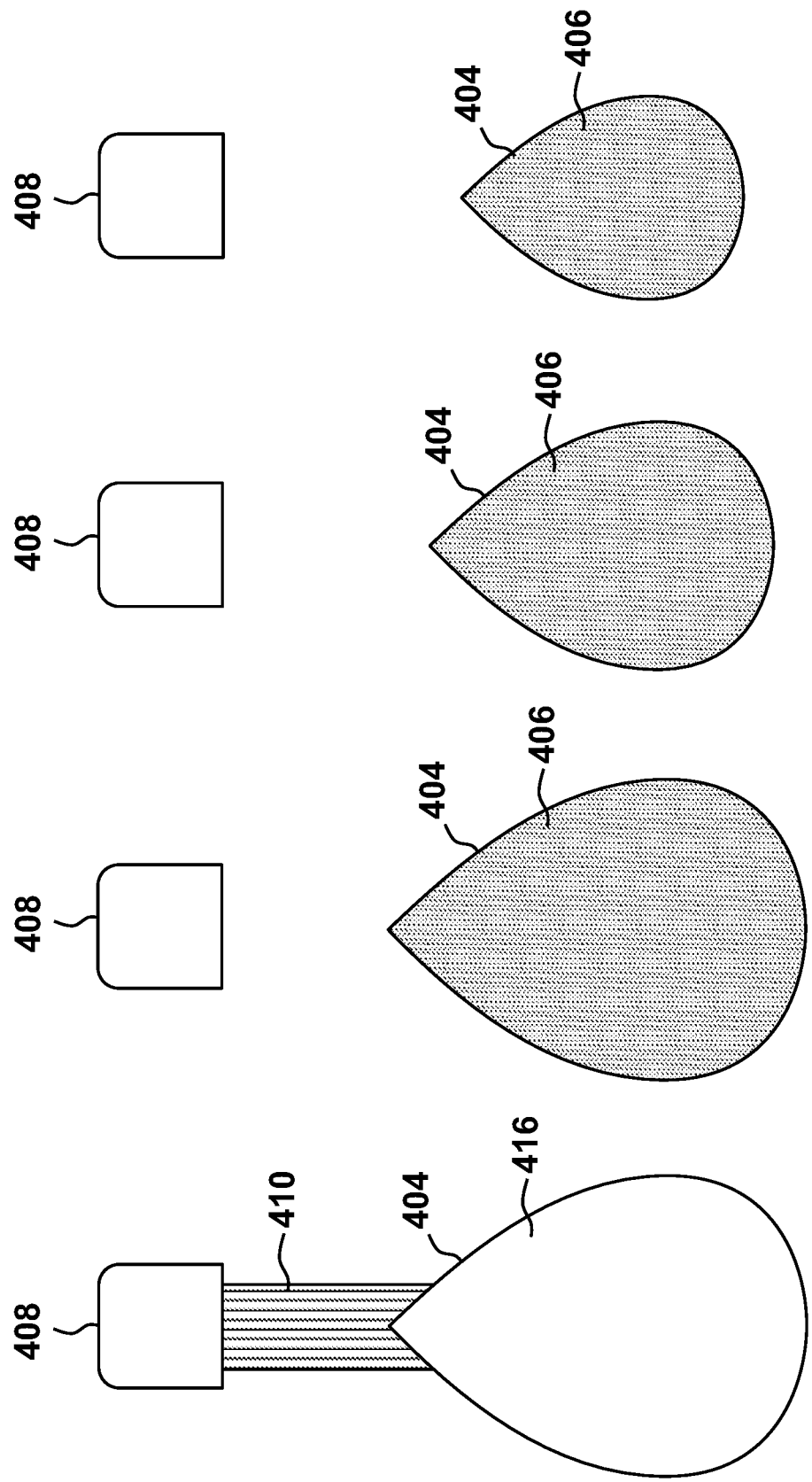

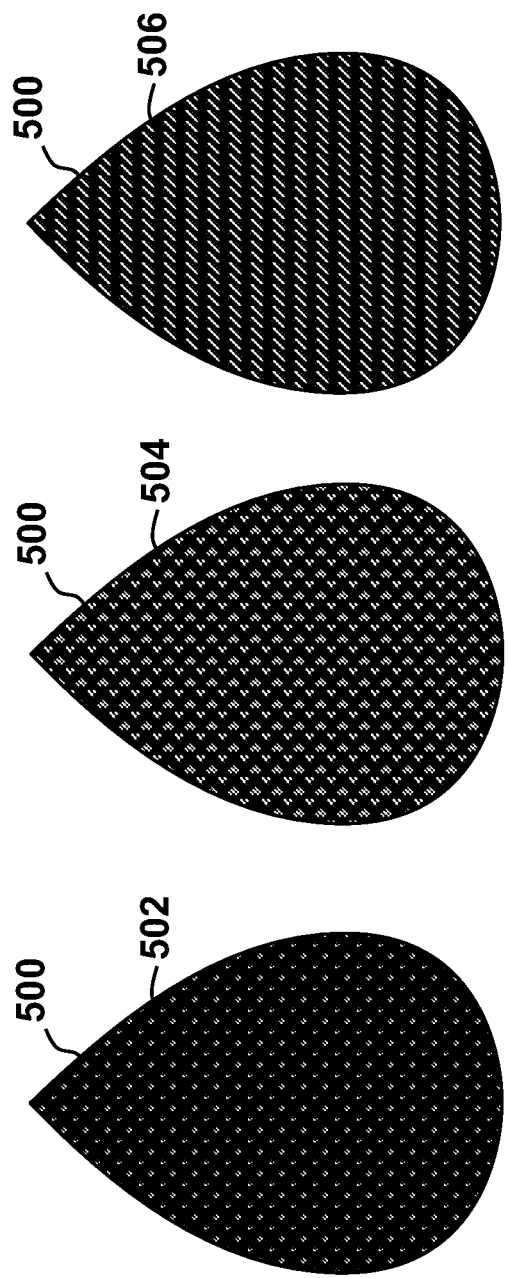

COLOR CHANGING COSMETIC TOOL

CROSS-REFERENCE TO RELATED APPLICATIONS

This application claims priority to and the benefit of U.S. Provisional Patent Application No. 62/869,460, filed Jul. 1, 2019, the contents of which are hereby incorporated by reference herein for all purposes.

TECHNICAL FIELD

Embodiments relate generally to makeup accessories, and more particularly to cosmetic tools and sponges.

BACKGROUND

A cosmetic sponge may be used to apply makeup, foundation, or the like. Cosmetic sponges can be delicate and may be damaged after use, such as by being crushed in a bag or torn by an object with sharp edges. In some instances, cosmetic sponges may increase greatly in size when damp and take several hours to return to their original size.

SUMMARY

A system embodiment may include: a cosmetic tool, e.g., sponge, comprising: a tip portion at one end of the cosmetic sponge; an angled portion, where the tip portion is surrounded by the angled portion; a bulbous portion, where the bulbous portion is disposed proximate a bottom of the cosmetic sponge; and a bottom portion, where the bottom portion is surrounded by the bulbous portion; and a thermochromic pigment in at least a portion of the cosmetic sponge, where the portion of the cosmetic sponge changes from a first color at a first temperature to a second color at a second temperature.

In additional system embodiments, the cosmetic sponge may provide a visual indication that the cosmetic sponge is ready to be used when the portion of the cosmetic sponge is the second color. In additional system embodiments, the cosmetic sponge may provide a visual indication that the cosmetic sponge is ready to be stored when the portion of the cosmetic sponge is the first color. In additional system embodiments, the portion of the cosmetic sponge that changes color may be an entire outer surface of the cosmetic sponge. In additional system embodiments, the portion of the cosmetic sponge that changes color may form text on a portion of the outer surface of the cosmetic sponge. In additional system embodiments, the portion of the cosmetic sponge that changes color may form a symbol on a portion of the outer surface of the cosmetic sponge.

A method embodiment may include: saturating a cosmetic sponge with warm water; changing, via a thermochromic pigment in at least a portion of the cosmetic sponge, the portion of the cosmetic sponge from a first color to a second color; using the cosmetic sponge to apply makeup while the portion of the cosmetic sponge is the second color; absorbing the warm water with cosmetic sponge after applying makeup to wash the cosmetic sponge to remove the makeup; and changing, via the thermochromic pigment, the portion of the cosmetic sponge from the second color to the first color.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 2A depicts a dry cosmetic sponge having a first color, according to one embodiment;

FIGS. 2B-2C depict the cosmetic sponge of FIG. 2A changing color as it absorbs water, according to one embodiment;

FIG. 2D depicts the cosmetic sponge of FIGS. 2A-2C having a second color after absorbing water, according to one embodiment;

FIG. 3A depicts a dampened cosmetic sponge having the second color after use, according to one embodiment;

FIGS. 3B-3C depict the dampened cosmetic sponge of FIG. 3A changing color it dries out and shrinks in size after use, according to one embodiment;

FIG. 3D depicts the cosmetic sponge of FIGS. 3A-3C having the first color after drying out, according to one embodiment;

FIG. 4A depicts a dampened cosmetic sponge having the second color after use, according to one embodiment;

FIGS. 4B-4D depict the dampened cosmetic sponge of FIG. 4A having the first color as it dries out and shrinks in size, according to one embodiment;

FIG. 5A depicts a cosmetic sponge having a first color at a first temperature, according to one embodiment;

FIG. 5B depicts the cosmetic sponge of FIG. 5A having a second color at a second temperature, according to one embodiment;

FIG. 5C depicts the cosmetic sponge of FIGS. 5A-5B having a third color at a third temperature, according to one embodiment;

DETAILED DESCRIPTION

Figure 1A:
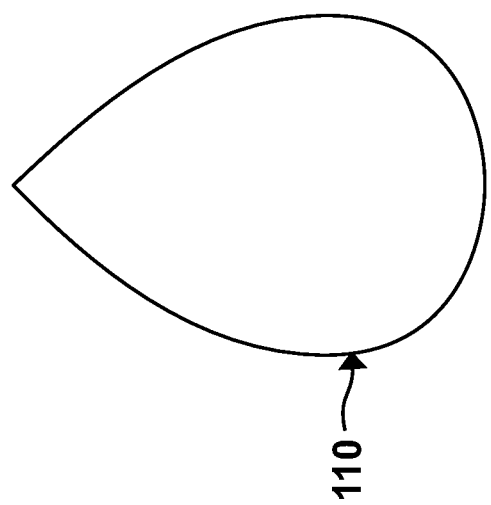
FIG. 1A depicts a dry cosmetic sponge, according to one embodiment.

The present systems and methods allow for a visual indication that a cosmetic tool, e.g., sponge, may be ready to be used and/or ready to be stored, where the cosmetic sponge may be configured to indicate such information based on certain conditions. Cosmetic sponges increase in size when exposed to water prior to use. The cosmetic sponge disclosed herein may include a thermochromic pigment or dye such that the cosmetic sponge changes color when it is ready to be used and/or ready to store. The change in color provides a visual indicator and/or communication to the user that the cosmetic sponge has changed modes, where in one example, they may begin using the cosmetic sponge or that the cosmetic sponge may be ready to be stored. The thermochromic pigment or dye may be used to color all, or a part of, the cosmetic sponge. Thermochromic pigment may use liquid crystals and/or leuco dyes depending on the needed results. In one embodiment, liquid crystals are used in precision applications, as their responses can be engineered to accurate temperatures, but their color range is limited by their principle of operation. In some embodiments, leuco dyes may provide for switching between two chemical forms; one of which may be colorless. In one embodiment, reversible transformations with leuco dyes may be caused by heat, light or pH. Leuco dyes may be used to allow a wider range of colors to be used, but their response temperatures may not be set with accuracy. In other embodiments, the cosmetic sponge may include a combination of liquid crystals and/or leuco dyes since some liquid crystals are capable of displaying different colors at different temperatures. This change is dependent on selective reflection of certain wavelengths by the crystallic structure of the material, as the material changes between the low-temperature crystallic phases, through anisotropic chiral or twisted nematic phase, to the high-temperature isotropic liquid phase.

In one embodiment of the cosmetic tool, the cosmetic sponge may be shaped in a way so as to provide ease of use and ability to hold and apply makeup. Accordingly, the sponge may be in the shape of a three-dimensional folium or a teardrop shape which may look like an oval with one end pointed outward. The cosmetic sponge may be completely convex, or the cosmetic sponge may become concave as the cosmetic sponge nears the point or tip. A completely convex teardrop shape may be called a folium. That is, the sponge may be shaped to fit all contours of the face. The cosmetic sponge may be made of absorbent material so as to retain liquid, such as water, and result in a change in the size of the cosmetic sponge in addition to the change in color. In one embodiment, the increase in size when exposed to water as well as the change in color can alert the user that the cosmetic sponge is ready to be used, e.g., damp enough to apply makeup to the skin. In another embodiment, the decrease in size when dry, as well as the change in color can alert the user that the cosmetic sponge is ready to be stored away.

FIG. 1A depicts a dry cosmetic sponge 100, according to the present embodiments. The cosmetic sponge may have a general teardrop shape as shown, an oval shape, or a shape with any number of contours. The various angles of the cosmetic sponge 100 are configured to allow the cosmetic sponge 100 to be used on various portions of a user's skin. The various angles of the cosmetic sponge 100 may also make the cosmetic sponge 100 susceptible to rolling on a flat surface, such as a countertop. The material of the cosmetic sponge 100 may also make the cosmetic sponge 100 susceptible to damage if stored with other objects, such as in a purse, handbag, or makeup container.

The cosmetic sponge 100 may include a tip portion 102. In some embodiments, the tip portion 102 may form a point. In other embodiments, the tip portion 102 may be rounded. The tip portion 102 may be surrounded by an angled portion 104. The angled portion may extend from a bulbous portion 106 to the tip portion 102 of the cosmetic sponge 100. The angled portion 104 may include a substantially flat section having a slight curve. The angled portion 104 provides an increased surface area for contact with a skin of a user when applying makeup, foundation, or the like from the cosmetic sponge 100. The tip portion 102 allows for fine application of makeup, foundation, or the like. For example, the tip portion 102 may be used for areas around the eyes of a user. The bottom portion 108 may be surrounded by the bulbous portion 106. The bulbous portion 106 may be disposed proximate the bottom of the cosmetic sponge 100 so as to provide additional surface area for the angled portion 104 and the tip portion 102 when applying makeup, foundation, or the like. A user may grip the cosmetic sponge 100 proximate the bulbous portion 106, which allows the user to bounce the cosmetic sponge 100 against the skin while maintaining a secure grip on the cosmetic sponge 100. The bottom portion 108 may be used for applying and/or blending makeup, foundation, or the like on larger areas of the skin, such as cheeks, the neck, or the like. The cosmetic sponge 100 may have symmetry such that the cosmetic sponge 100 may be used without needing to orient the cosmetic sponge 100 in a particular direction. Accordingly, the cosmetic sponge 100 may be picked up and used by a user by feel where the user can adjust their grip by touch to apply makeup, foundation, or the like via the tip section 102, angled section 104, bulbous section 106, and/or bottom section 108.

Figure 1B:
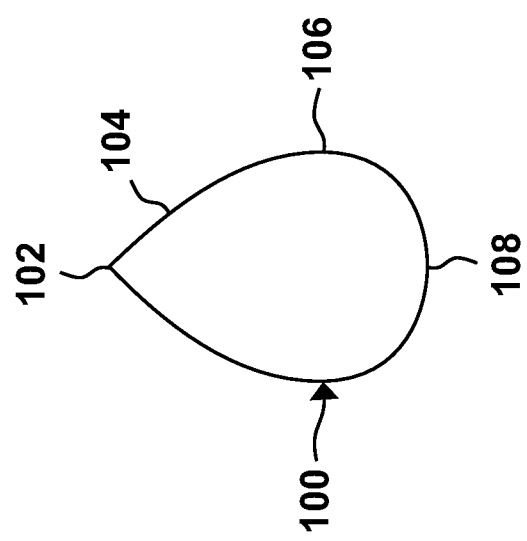
FIG. 1B depicts a dampened cosmetic sponge, according to one embodiment.

FIG. 1B depicts a dampened cosmetic sponge 110, according to one embodiment. The cosmetic sponge (100, FIG. 1A) may be dampened, such as with water, prior to use. In another embodiment, the cosmetic sponge (100, FIG. 1A) may be dampened with a cleaning solution. Adding water to the cosmetic sponge (100, FIG. 1A) causes the dampened cosmetic sponge 110 to increase greatly in size. The dampened cosmetic sponge provides a greater surface area and absorption for applying makeup, foundation, or the like. Once the dampened cosmetic sponge 110 has been used for the intended purpose, the cosmetic sponge 110 may remain at the larger size for several hours before drying and returning to its original size. As a result, the dampened cosmetic sponge 110 may not fit in an original packaging or space the cosmetic sponge 110 fit prior to use. Squishing the dampened cosmetic sponge 110 to fit in an original packaging or space may cause damage to the dampened cosmetic sponge 110 and/or reduce the lifetime of the dampened cosmetic sponge 110. Due to increased size of the cosmetic sponge, the dampened cosmetic sponge 110 is more difficult to store and more susceptible to rolling on a flat surface than the dry cosmetic sponge (100, FIG. 1A).

FIG. 2A depicts a dry cosmetic sponge 200 having a first color 206, according to one embodiment. In some embodiments, the first color 206 may be purple. The first color 206 may be via a thermochromic pigment or dye. The dry cosmetic sponge 200 may be smaller in size as the dry cosmetic sponge 200 is not saturated with water, such as from a faucet 208. The cosmetic sponge 200 via the thermochromic pigment or dye, may change colors based on a change in temperature, in some embodiments.

FIGS. 2B-2C depict the cosmetic sponge 200 of FIG. 2A changing color as it absorbs water 210, according to one embodiment. The cosmetic sponge 200 may in some embodiments increase in size as it absorbs liquid, such as water 210 from, for example, the faucet 208. In one embodiment, the water 210 is lukewarm water from a faucet. In another embodiment, the water 210 is cold water from a faucet. In another embodiment, the water 210 is hot water from a faucet. The cosmetic sponge may begin to change color from the first color (206, FIG. 2A) to a first transition color 212 and to a second transition color 214 as the cosmetic sponge absorbs liquid over a period of time. In some embodiments, the first transition color 212 and/or second transition color 214 may be a gradient of colors from the first color (206, FIG. 2A) to the second color (216, FIG.

2D). For example, if the first color (206, FIG. 2A) is purple and the second color (216, FIG. 2D) is white, then the transition colors 212, 214 may be increasingly fainter shades of purple.

In one embodiment, the cosmetic sponge 200 may change color in response to temperature, such as temperature of the skin. For example, the cosmetic sponge 200 may change color at the areas where the cosmetic sponge 200 is being gripped by a user's finger tips. In another example, the color of the cosmetic sponge 200 may change based on the location of the face that the cosmetic sponge is being applied. For example, the forehead may be warmer than the cheek; hence, the forehead my cause the cosmetic sponge 200 to be a different color or shade than when the cosmetic sponge 200 is applied to the cheek.

In another embodiment, a certain change in color of the cosmetic sponge 200 may be an indication that the cosmetic sponge 200 is being used incorrectly. For example, dabbing of the cosmetic sponge 200 on the skin may be the correct motion for optimal application of a certain makeup. In this case the cosmetic sponge 200 may turn blue when being applied in this correct manner. However, if the makeup is applied in an incorrect fashion, such as dragging of the makeup with the cosmetic sponge 200 across the skin, the cosmetic sponge 200 may transition to a red color. Other possible color combinations are possible and contemplated.

FIG. 2D depicts the cosmetic sponge 200 of FIGS. 2A-2C having the second color 216 after absorbing water, according to one embodiment. The second color 216 may be lighter so as to better show any makeup, foundation, or the like that are applied to the surface of the cosmetic sponge 200. In some embodiments, the second color 216 may be white. The first color (206, FIG. 2A) may be a darker color, such as purple, so as to hide any discoloration from makeup, foundation, or the like.

In one embodiment, the cosmetic sponge 200 may change color based on the specific makeup or type of makeup being applied. More specifically, the cosmetic sponge 200 may change color in a particular area indicating that the particular area is most suited to be used for applying the desired cosmetics, based on the specific or type of makeup applied. That is, in one example, a tip portion of the cosmetic sponge 200 (see for example tip portion 102 of FIG. 1A) may change color indicating that the particular area of the sponge should be used as this area may be most suited to apply eye makeup in the areas close around the eye. In another example, a bottom portion of the cosmetic sponge 200 may change color based on a particular cosmetic that is applied to the sponge. Accordingly, a particular cosmetic may be applied to the entire sponge and based on the type of cosmetic, the sponge may determine which area to change color so as to indicate to the user which areas are best to be used with that particular cosmetic, where the determination may, in some embodiments, be based on the chemical formula of the particular cosmetic. In one embodiment, to accomplish different areas of the cosmetic sponge 200 turning a different color, the cosmetic sponge 200 may be made of different materials in different areas of the sponge. For example, the cosmetic sponge may comprise one or more divisions and/or subdivisions where each subdivided area on the sponge—depending on necessary usage—may comprise material that turns a specific color based on a specific liquid temperature and/or chemical formula of the cosmetic. Any combination of material and/or subdivisions is contemplated as part of these embodiments. In one embodiment, the one or more subdivisions may be a bulbous end of the cosmetic sponge 200, the tip of the cosmetic sponge 200, and so forth.

In an alternate embodiment, the user may use a particular temperature liquid based on the type of cosmetic they want to use and the cosmetic sponge 200 may change color in a specific area which is most appropriate for use for that cosmetic. That is, based on a predefined mapping, the user may use cold, lukewarm, warm, hot, etc. liquid such as water, and the cosmetic sponge 200 change colors at the tip signaling that for that particular type of makeup, the best use would be to apply the cosmetic.

In another embodiment, the first color 206 of the cosmetic sponge 200 may change to a second color 216, different than the first color, depending on the type of cosmetic being applied to it, for example, whether a foundation is being applied versus a concealer. In one example, the cosmetic sponge 200 may change to a second color 216 red if foundation is being applied to the sponge, while the cosmetic sponge 200 may change to a second color 216 blue if concealer is being used. Accordingly, the sponge, by changing color based on the different type of cosmetic being applied to the sponge, may indicate to the user whether they are using the correct cosmetic for their purpose.

In one embodiment, only a portion of the cosmetic sponge 200 may change from a first color 206 to a second color 216. For example, the cosmetic sponge 200 color may change in an area that corresponds to a preferred use of the cosmetic sponge 200, such as a tip portion changing color to indicate the cosmetic sponge 200 is to be used for eye makeup application. In another embodiment, the cosmetic sponge 200 color may change in an area that indicates where to grip the cosmetic sponge 200 for optimal application. For example, for application of eye makeup with a tip portion of the cosmetic sponge 200, the cosmetic sponge 200 may change color at the bulbous bottom section of the cosmetic sponge 200 to indicate to the user to grip the cosmetic sponge 200 at the bulbous bottom section.

FIG. 3A depicts a dampened cosmetic sponge 304 having the second color 316 after use, according to one embodiment. The cosmetic sponge 304 may be washed after use, such as via water 310 from a faucet 308, to remove any makeup, foundation, oils from the skin, or the like. The cosmetic sponge 304 may take several hours to dry and return to its original size. In one embodiment, the cosmetic sponge 304 may, for example, be placed a safe distance from a hair dryer, and the warm air of the hair dryer may expedite the drying process.

FIGS. 3B-3C depict the dampened cosmetic sponge 304 of FIG. 3A changing color as it dries out and shrinks in size after use, according to one embodiment. The cosmetic sponge 304 may take several hours to dry out and return to its original size, as shown in FIG. 3D. As the cosmetic sponge 304 dries, it may change colors to the second intermediate color 314 and the first intermediate color 312.

FIG. 3D depicts the cosmetic sponge 304 of FIGS. 3A-3C having the first color 306 after drying out, according to one embodiment. In some embodiments, the change in color may provide a visual indication that the sponge is dry and that it may be safely stored. The water (310, FIG. 3A) absorbed by the cosmetic sponge 304 may prolong the color changing process as the water gradually evaporates and the cosmetic sponge 304 dries out. In one embodiment, the water is warm water. In another embodiment, the water may be cold.

FIG. 4A depicts a dampened cosmetic sponge 404 having the second color 416 after use, according to one embodiment. The cosmetic sponge 404 may be washed after use, such as via water 410 from a faucet 408, to remove any makeup, foundation, oils from the skin, or the like. The cosmetic sponge 404 may take several hours to dry and return to the cosmetic sponge's original size.

FIGS. 4B-4D depict the dampened cosmetic sponge 404 of FIG. 4A having the first color 406 as it dries out and shrinks in size, according to one embodiment. In some embodiments, the cosmetic sponge 404 may change color from the second color (416, FIG. 4A) to the first color 406 shortly after use and may then take several hours to return to its original size, as shown in FIG. 4D. In one embodiment, the quick color transition may serve as a visual indicator to a user that they need to re-wet (dampen again) their cosmetic sponge 404 if the cosmetic sponge 404 begins to change color or changes back to the first color 406 during use.

FIGS. 3B-D show a gradual changing of color to the first color as the sponge dries out and shrinks. FIGS. 4B-D show a rapid changing of color as the sponges have quickly changed to the first color as the sponge dries, yet the shrinking is still gradual.

FIG. 5A depicts a cosmetic sponge 500 having a first color 502 at a first temperature, according to one embodiment. FIG. 5B depicts the cosmetic sponge 500 of FIG. 5A having a second color 504 at a second temperature, according to one embodiment. FIG. 5C depicts the cosmetic sponge 500 of FIGS. 5A-5B having a third color 506 at a third temperature, according to one embodiment. In some embodiments, the cosmetic sponge may transition between two or more colors based on the temperature. For example, the first color 502 and first temperature may be prior to use; the second color 504 and second temperature may be during use; and the third color 506 and third temperature may be a high temperature cleaning to remove oils, makeup, foundation, or the like. In another example, the first color 502 and first temperature may be prior to use; the second color 504 and second temperature may be during use; and the third color 506 and third temperature may be an indicator that additional water is needed to be added to the cosmetic sponge 500 to return it to the second color 504 and second temperature indicating that it is ready for use. The cosmetic sponge 500 may include a thermochromic pigment or dye to transition between two or more colors and temperatures. In one embodiment, the water temperature may be adjusted warmer or colder to reach the desired second color 504 during use.

Figure 6B:
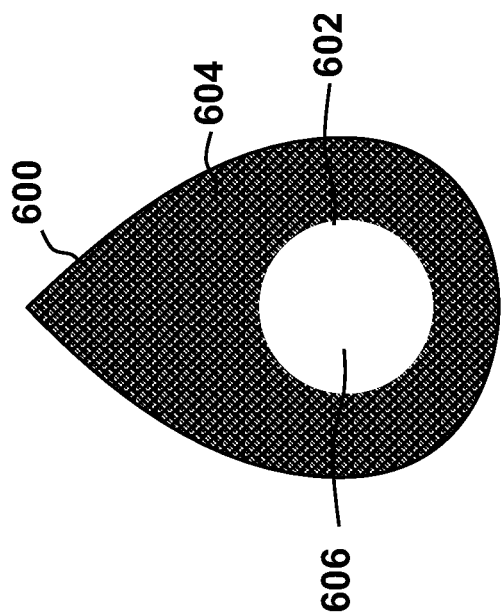
FIG. 6B depicts the cosmetic sponge of FIG. 6A with the color changing portion having changed color from a first color to a second color.
Figure 6A:
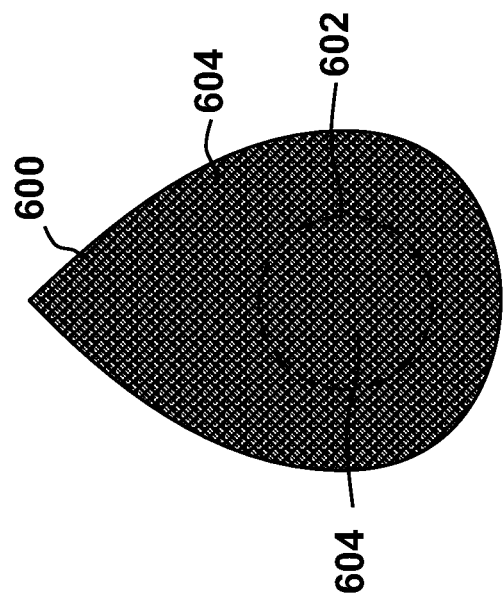
FIG. 6A depicts a cosmetic sponge having a color changing portion indicated with dashed lines, according to one embodiment.

FIG. 6A depicts a cosmetic sponge 600 having a color changing portion 602 indicated with dashed lines, according to one embodiment. The color changing portion 602 may have a first color 604 that matches the first color 604 of the rest of the outer surface of the cosmetic sponge 600.

FIG. 6B depicts the cosmetic sponge 600 of FIG. 6A with the color changing portion 602 having changed color from the first color 604 to a second color 606. The color changing portion 602 changes to the second color 606 which is in contrast to the first color 604 of the rest of the outer surface of the cosmetic sponge 600. This color changing portion 602 may be used to indicate to the user that the cosmetic sponge 600 is ready to be used, that more water is needed for the cosmetic sponge 600, and/or that the cosmetic sponge 600 is ready to be stored. The color changing portion 602 may return from the second color 606 to the first color 604 as described herein.

Figure 7B:
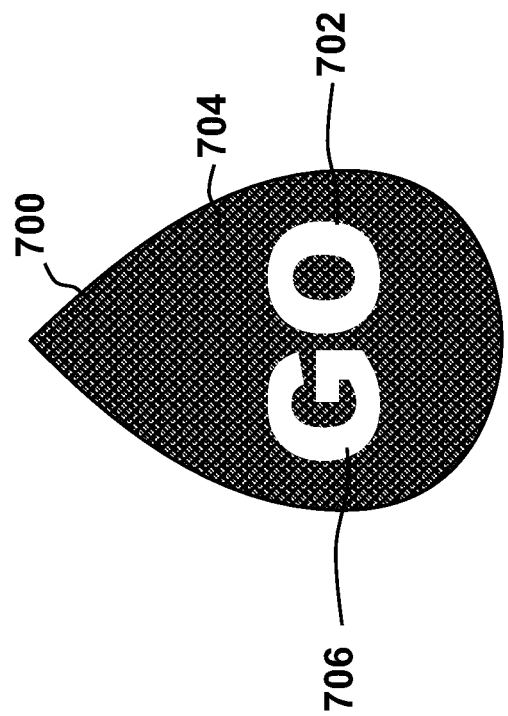
FIG. 7B depicts the cosmetic sponge of FIG. 7A with the color changing portion revealed at a second temperature, according to one embodiment.
Figure 7A:
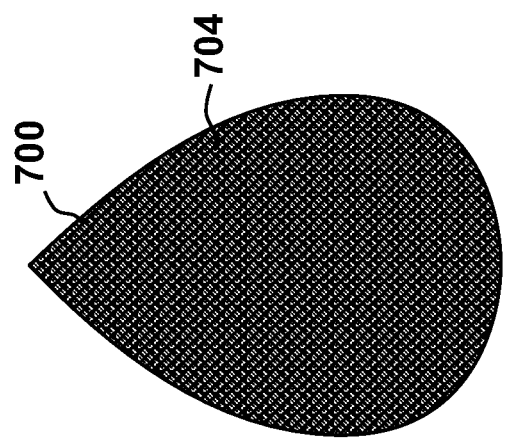
FIG. 7A depicts a cosmetic sponge having a color changing portion hidden at a first temperature, according to one embodiment.

FIG. 7A depicts a cosmetic sponge 700 having a color changing portion 702 hidden at a first temperature, according to one embodiment. FIG. 7B depicts the cosmetic sponge 700 of FIG. 7A with the color changing portion 702 revealed at a second temperature, according to one embodiment. In this example, the color changing portion 702 includes a pattern, such as alphanumeric characters, e.g., the text 'GO' which is not displayed at the first temperature shown in FIG. 7A and revealed in the second temperature shown in FIG. 7B. Any text, symbols, decoration, or the like may be colored with a thermochromic pigment or dye where the remaining portion of the cosmetic sponge 700 may be a fixed color such that the text, symbols, decoration, or the like are revealed when warm water is added to the cosmetic sponge 700 and/or the cosmetic sponge 700 dries out. The color changing portion 702 may return from the second color 706 to the first color 704 as described herein. The color changing pattern 702 may also include instructions, such as go, add water, let dry, or the like depending on the temperature at which the color changes. In another embodiment, the cosmetic sponge 700 may have a different thermochromic pigment than the color changing portion 702, such that when warm water is added to the cosmetic sponge 700 and/or the cosmetic sponge 700 dries out the cosmetic sponge 700 and the color changing portion 702 reveal different color changes.

Figure 8:
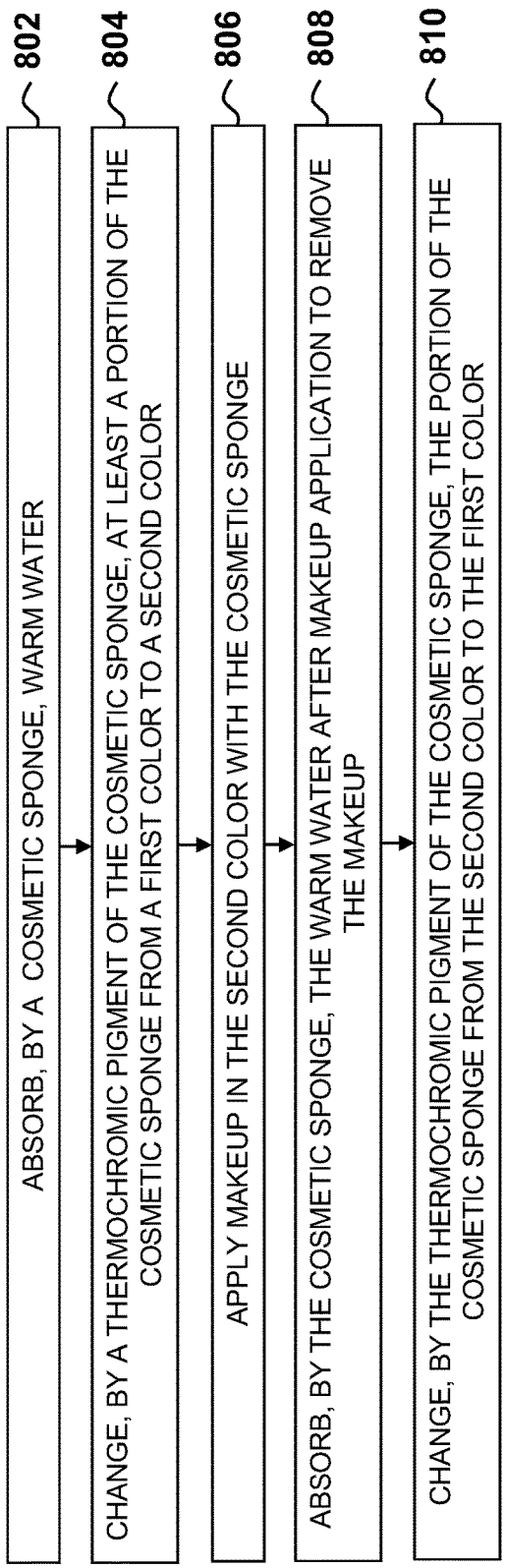
FIG. 8 depicts a high-level flowchart of a method embodiment of changing color of a portion of a cosmetic sponge, according to one embodiment.

FIG. 8 depicts a high-level flowchart of a method embodiment 800 of changing color of a portion of a cosmetic sponge, according to one embodiment. The method 800 may include absorbing warm water by a cosmetic sponge (step 802). The method 800 may then include changing at least a portion of the cosmetic sponge from a first color to a second color with a thermochromic pigment of the cosmetic sponge (step 804). In some embodiments, the cosmetic sponge may change between two or more colors. In some embodiments, the cosmetic sponge may also increase in size to alert a user to apply makeup. The method 800 may then include applying makeup with the cosmetic sponge when the cosmetic sponge is in the second color (step 806). The method 800 may then include absorbing the warm water by the cosmetic sponge after application of the makeup to remove or wash the makeup (step 808). In other embodiments, the cosmetic sponge may be washed in cold water after use or not washed at all. The method 800 may then include changing the portion of the cosmetic sponge from the second color to the first color with the thermochromic pigment of the cosmetic sponge (step 810). In one embodiment, the cosmetic sponge may be stored when the color of the cosmetic sponge changes from the second color back to the first color. In some embodiment, the cosmetic sponge may also decrease in size to alert the user that the cosmetic sponge is ready to be stored away. In some embodiments, the color may change prior to the sponge reducing in size to at or near its original size. In other embodiments, the color may change as the sponge reduces in size to at or near its original size.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
    absorbing liquid with a cosmetic sponge, wherein the cosmetic sponge comprises: a tip portion at one end of the cosmetic sponge; an angled portion, wherein the tip portion is surrounded by the angled portion; a bulbous portion, wherein the bulbous portion is disposed proximate a bottom of the cosmetic sponge; and a bottom portion, wherein the bottom portion is surrounded by the bulbous portion;

changing, via a thermochromic pigment in at least a portion of the cosmetic sponge, the portion of the cosmetic sponge from a first color at a first temperature to a second color at a second temperature, wherein the liquid is at least at the second temperature;

applying makeup with the cosmetic sponge while the portion of the cosmetic sponge is the second color;

absorbing liquid with the cosmetic sponge after applying makeup to remove the makeup;

changing, via the thermochromic pigment, the portion of the cosmetic sponge from the second color to the first color as the cosmetic sponge returns to the first temperature; and storing the cosmetic sponge when the portion of the cosmetic sponge is the first color.

2. The method of claim 1 further comprising:
providing a visual indication that the cosmetic sponge is ready to be used when the portion of the cosmetic sponge is the second color.

3. The method of claim 1, wherein the portion of the cosmetic sponge that changes color is an entire outer surface of the cosmetic sponge.

4. The method of claim 1, wherein the portion of the cosmetic sponge that changes color is a portion of an outer surface of the cosmetic sponge.

5. The method of claim 4, wherein the portion of the cosmetic sponge that changes color forms at least one of: a text on a portion of the outer surface of the cosmetic sponge and a symbol on a portion of the outer surface of the cosmetic sponge.

6. The method of claim 1 further comprising:
changing the portion of the cosmetic sponge from the second color at the second temperature to a third color at a third temperature.

7. The method of claim 6, wherein the third temperature is a high temperature for cleaning the cosmetic sponge of at least one of: oil, makeup, and foundation.

8. The method of claim 1, wherein the first temperature is approximate an ambient temperature and a second temperature is approximate a skin temperature of a user.

9. A system comprising:
a cosmetic sponge comprising:
a tip portion at one end of the cosmetic sponge;
an angled portion, wherein the tip portion is surrounded by the angled portion;
a bulbous portion, wherein the bulbous portion is disposed proximate a bottom of the cosmetic sponge; and
a bottom portion, wherein the bottom portion is surrounded by the bulbous portion;
a thermochromic pigment in at least a portion of the cosmetic sponge, wherein the thermochromic pigment is configured to change the portion of the cosmetic sponge from a first color at a first temperature to a second color at a second temperature in response to absorbing liquid by the cosmetic sponge, wherein the liquid is at least at the second temperature;

wherein the cosmetic sponge is configured to apply makeup while the portion of the cosmetic sponge is the second color;

wherein the cosmetic sponge is configured to absorb liquid after applying makeup to remove the makeup;

wherein the portion of the cosmetic sponge having the thermochromic pigment is configured to change from the second color to the first color as the cosmetic sponge returns to the first temperature; and wherein the cosmetic sponge is configured to be stored when the portion of the cosmetic sponge is the first color.

10. The system of claim 9, wherein the portion of the cosmetic sponge that changes color is an entire outer surface of the cosmetic sponge.

11. The system of claim 9, wherein the portion of the cosmetic sponge that changes color is a portion of an outer surface of the cosmetic sponge.

12. The system of claim 11, wherein the portion of the cosmetic sponge that changes color forms at least one of: a text on a portion of the outer surface of the cosmetic sponge and a symbol on a portion of the outer surface of the cosmetic sponge.

13. The system of claim 9, wherein the portion of the cosmetic sponge is configured to change from the second color at the second temperature to a third color at a third temperature.

14. The system of claim 13, wherein the third temperature is a high temperature for cleaning the cosmetic sponge of at least one of: oil, makeup, and foundation.

15. The system of claim 9, wherein the first temperature is approximate an ambient temperature and a second temperature is approximate a skin temperature of a user.

16. A method comprising:
absorbing liquid with a cosmetic sponge, wherein the cosmetic sponge comprises one or more portions;

changing, via a thermochromic pigment in at least a portion of the cosmetic sponge, the portion of the cosmetic sponge from a first color at a first temperature to a second color at a second temperature;

absorbing liquid with the cosmetic sponge after applying makeup with the cosmetic sponge to remove the applied makeup;

changing, via the thermochromic pigment, the portion of the cosmetic sponge from the second color to the first color as the cosmetic sponge returns to the first temperature; and storing the cosmetic sponge when the portion of the cosmetic sponge is the first color.

* * * * *